(12) United States Patent
Nigo et al.

(10) Patent No.: US 10,284,030 B2
(45) Date of Patent: May 7, 2019

(54) PERMANENT MAGNET EMBEDDED ELECTRIC MOTOR, COMPRESSOR, AND A REFRIGERATING AND AIR CONDITIONING DEVICE

(71) Applicant: Mitsubishi Electric Corporation, Tokyo (JP)

(72) Inventors: Masahiro Nigo, Tokyo (JP); Kazuchika Tsuchida, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 53 days.

(21) Appl. No.: 15/027,013

(22) PCT Filed: Sep. 1, 2014

(86) PCT No.: PCT/JP2014/072962
§ 371 (c)(1),
(2) Date: Apr. 4, 2016

(87) PCT Pub. No.: WO2015/064199
PCT Pub. Date: May 7, 2015

(65) Prior Publication Data
US 2016/0241092 A1 Aug. 18, 2016

(30) Foreign Application Priority Data

Oct. 29, 2013 (WO) .................. PCT/JP2013/079317

(51) Int. Cl.
*H02K 1/18* (2006.01)
*H02K 21/16* (2006.01)
(Continued)

(52) U.S. Cl.
CPC ........... *H02K 1/185* (2013.01); *F04C 18/344* (2013.01); *F04C 29/005* (2013.01);
(Continued)

(58) Field of Classification Search
CPC ............ H02K 1/185; H02K 1/12; H02K 1/14; H02K 1/146; H02K 1/27; H02K 1/276; H02K 21/16
(Continued)

(56) References Cited

U.S. PATENT DOCUMENTS 4,883,981 A * 11/1989 Gerfast .................... H02K 3/04
310/179
5,962,944 A * 10/1999 Narita .................... H02K 1/276
310/112
(Continued)

FOREIGN PATENT DOCUMENTS

EP 2161814 A2 3/2010
JP S63-029355 U 2/1988
(Continued)

OTHER PUBLICATIONS

Office Action dated Aug. 3, 2017 issued in corresponding CN patent application No. 201480057279.5 (and English translation).
(Continued)

*Primary Examiner* — Terrance L Kenerly
(74) *Attorney, Agent, or Firm* — Posz Law Group, PLC

(57) ABSTRACT

A permanent magnet embedded electric motor includes a stator core disposed inside the frame and having a back yoke and a plurality of magnetic pole teeth; a rotor disposed on an inner diameter side of the plurality of magnetic pole teeth; and compression sections in which compression stress higher than compression stress occurring in the back yoke due to pressing force generated between the frame and the back yoke occurs. A compression section group having a set of two or more compression sections and of the plurality of compression sections is disposed on an outer circumferential section of the stator core. A sum of the rotating direction widths of the plurality of compression sections constituting
(Continued)

the compression section group is smaller than a radial direction thickness of the frame.

18 Claims, 10 Drawing Sheets

(51) Int. Cl.
    *H02K 1/14*     (2006.01)
    *F04C 18/344*     (2006.01)
    *F04C 29/00*     (2006.01)
    *F04C 29/02*     (2006.01)
    *H02K 1/12*     (2006.01)
    *H02K 1/27*     (2006.01)

(52) U.S. Cl.
    CPC .......... *F04C 29/0085* (2013.01); *F04C 29/02* (2013.01); *H02K 1/12* (2013.01); *H02K 1/14* (2013.01); *H02K 1/146* (2013.01); *H02K 1/27* (2013.01); *H02K 1/276* (2013.01); *H02K 21/16* (2013.01); *F04C 2210/22* (2013.01); *F04C 2240/20* (2013.01); *F04C 2240/30* (2013.01); *F04C 2240/50* (2013.01); *F04C 2240/60* (2013.01); *H02K 2213/03* (2013.01)

(58) Field of Classification Search
    USPC ..................................................... 310/156.53
    See application file for complete search history.

(56) References Cited

U.S. PATENT DOCUMENTS

| | | | | |
|---|---|---|---|---|
| 6,836,051 | B2* | 12/2004 | Hiwaki | H02K 1/185 310/254.1 |
| 7,938,633 | B2* | 5/2011 | Iguchi | F01C 21/10 310/216.049 |
| 8,035,271 | B2 | 10/2011 | Sano et al. | |
| 8,970,077 | B2 | 3/2015 | Murakami et al. | |
| 2001/0002977 | A1* | 6/2001 | Morita | F04B 35/045 417/417 |
| 2002/0130576 | A1* | 9/2002 | Tajima | B60L 15/025 310/156.56 |
| 2009/0113696 | A1* | 5/2009 | Holmes | H02K 1/02 29/596 |
| 2010/0007236 | A1* | 1/2010 | Sano | H02K 1/148 310/216.135 |
| 2013/0093273 | A1 | 4/2013 | Murakami et al. | |
| 2013/0342068 | A1 | 12/2013 | Ogawa et al. | |

FOREIGN PATENT DOCUMENTS

| | | |
|---|---|---|
| JP | H04-325846 A | 11/1992 |
| JP | 2001-078375 A | 3/2001 |
| JP | 2004-201428 A | 7/2004 |
| JP | 2004-274995 A | 9/2004 |
| JP | 2005-051941 A | 2/2005 |
| JP | 2005-080451 A | 3/2005 |
| JP | 2005-184873 A | 7/2005 |
| JP | 2005-354870 A | 12/2005 |
| JP | 2006-121818 A | 5/2006 |
| JP | 2008-104325 A | 5/2008 |
| JP | 2008-199711 A | 8/2008 |
| JP | 2009-005489 A | 1/2009 |
| JP | 2009-118680 A | 5/2009 |
| JP | 4356571 B2 | 8/2009 |
| JP | 2009254086 * | 10/2009 ............. H02K 15/02 |
| JP | 2010-075011 A | 4/2010 |
| JP | 2010-148329 A | 7/2010 |
| JP | 2011-019398 A | 1/2011 |
| JP | 2011-078166 A | 4/2011 |
| JP | 2011-091936 A | 5/2011 |
| JP | 2011-139584 A | 7/2011 |
| JP | 2012-055117 A | 3/2012 |
| JP | WO2012105350 * | 8/2012 ............. H02K 1/146 |
| JP | 2012-222836 A | 11/2012 |
| JP | 2013-059262 A | 3/2013 |
| JP | 2013-90405 A | 5/2013 |
| WO | 2012/105249 A1 | 8/2012 |
| WO | 2014/128938 A1 | 8/2014 |

OTHER PUBLICATIONS

Office Action dated Mar. 14, 2017 issued in corresponding JP patent application No. 2015-544847 (and English translation).
Office Action dated Sep. 27, 2016 issued in corresponding JP patent application No. 2015-544847 (and English translation).
International Search Report of the International Searching Authority dated Dec. 2, 2014 for the corresponding international application No. PCT/JP2014/072962 (and English translation).
Office Action dated Jan. 17, 2018 issued in corresponding CN patent application No. 201480057279.5 (and English translation).
EP Search Report dated Nov. 17, 2017 issued in corresponding EP patent application No. 14857137.5.
Japanese Office Action dated Apr. 3, 2018 issued in corresponding JP application No. 2015-544847 (with English translation).
Office action dated Jun. 29, 2018 issued in corresponding CN patent application No. 201480057279.5 (and English machine translation thereof).
Office action dated Dec. 27, 2018 issued in corresponding CN patent application No. 201480057279.5 (and English machine translation thereof).
Office action dated Jan. 31, 2019 issued in corresponding IN patent application No. 201647016377.

* cited by examiner

PERMANENT MAGNET EMBEDDED ELECTRIC MOTOR, COMPRESSOR, AND A REFRIGERATING AND AIR CONDITIONING DEVICE

CROSS REFERENCE TO RELATED APPLICATION

This application is a U.S. national stage application of International Patent Application No. PCT/JP2014/072962 filed on Sep. 1, 2014, which claims priority to International Patent Application No. PCT/JP2013/079317 filed on Oct. 29, 2013, the disclosures of which are incorporated herein by reference.

TECHNICAL FIELD

The present invention relates to a permanent magnet embedded electric motor that includes a frame, a stator core disposed inside the frame, and a rotor disposed on an inner diameter side of the stator core; to a compressor; and to a refrigerating and air conditioning device.

BACKGROUND

In a compressor that uses a permanent magnet embedded electric motor as a drive source, a stator core of an electric motor is often fixed to an inner circumferential section of a cylindrical frame by using a shrink-fit or press-fit. The stator core of a conventional electric motor as described in Patent Literature 1 has a back yoke and a plurality of magnetic pole teeth extending from the back yoke in a direction toward the center of the electric motor. The stator core is fixed inside the outer circumferential section of the back yoke by the shrink-fit, in a state in which the outer circumferential section of the back yoke corresponding to each of the magnetic pole teeth is not in contact with the inner circumferential section of the frame and in a state in which the outer circumferential section of the back yoke other than the position corresponding to the magnetic pole teeth is in contact with the inner circumferential section of the frame. Because a part of the outer circumferential section of the back yoke is in a state of not being in contact with the inner circumferential section of the frame in this way, a gap between the stator core and the rotor is prevented from becoming uneven due to the deformation of the stator core. In the conventional technique described in Patent Literature 2, a plurality of stress relaxation slits are formed on an outer circumferential section of a split yoke portion corresponding to a split stator core, and when a stress-receiving section provided in each of the stress relaxation slits is deformed, the compression stress occurring in a magnetic flux region in the split yoke is reduced, thereby improving the iron loss characteristics in the split stator cores.

PATENT LITERATURE

Patent Literature 1: Japanese Patent Application Laid-Open No. 2001-78375
Patent Literature 2: Japanese Patent Application Laid-Open No. 2005-51941

However, in the related art illustrated in Patent Literature 1, because most of the outer circumferential section of the back yoke is fixed in a state of being in contact with the inner circumferential section of the frame, any magnetic flux that is incapable of passing through the inner circumferential side of the back yoke leaks to the frame via a contact portion between the outer circumferential section of the back yoke and the inner circumferential section of the frame. Because a large iron loss occurs in the frame due to the magnetic flux leakage to the frame, there is a risk of performance degradation of the electric motor due to the magnetic flux leakage. In particular, because the magnetic flux leakage to the frame increases in an electric motor using a magnet with a high magnetic flux density, such as a rare earth magnet, an efficiency drop of the electric motor becomes a problem. Meanwhile, in the related art illustrated in Patent Literature 2, the sum of rotating direction widths of radially outer tip surfaces of a plurality of stress-receiving sections is greater than the thickness of the core case. Therefore, when the split stator core is housed in the core case by using a shrink-fit, the force that presses the stress-receiving section group is absorbed by the core case, and the core case is more easily deformed than the stress-receiving section group. In this case, high compression stress does not act on the stress-receiving section group, and the magnetic permeability in the stress-receiving section group remains a high value. Thus, there are problems in that the magnetic flux leaks along a path from the split stator core, via the stress-receiving section group, to the core case. This leads to an increase in the iron loss due to the magnetic flux leakage in the core case and a decrease in the efficiency of the electric motor.

SUMMARY

The present invention has been achieved in view of the above and an objective of the present invention is to provide a permanent magnet embedded electric motor, a compressor, and a refrigerating and air conditioning device capable of improving the electric motor efficiency.

In order to solve the problem and achieve the objective mentioned above, the present invention relates to a permanent magnet embedded electric motor that includes: a stator core disposed inside a frame and having a back yoke and a plurality of magnetic pole teeth extending from the back yoke in a direction toward a center of the back yoke; a rotor disposed on an inner diameter side of the plurality of magnetic pole teeth; and a plurality of compression sections which are formed between an outer circumferential section of the back yoke and an inner circumferential section of the frame, and in which, by being deformed by the pressing force generated between the frame and the back yoke, compression stress occurs that is higher than compression stress generated due to the pressing force in the back yoke. A compression section group having a set of two or more compression sections of the plurality of compression sections is disposed on the outer circumferential section of the back yoke corresponding to each of the plurality of magnetic pole teeth. A sum of rotating direction widths in the plurality of compression sections constituting the compression section group is smaller than a radial direction thickness of the frame.

The present invention achieves an effect whereby it is possible to improve the efficiency of an electric motor.

DETAILED DESCRIPTION

Exemplary embodiments of a permanent magnet embedded electric motor, a compressor, and a refrigerating and air conditioning device according to the present invention will be described in detail below with reference to the drawings. The present invention is not limited to these embodiments.

Embodiment

Figure 1:
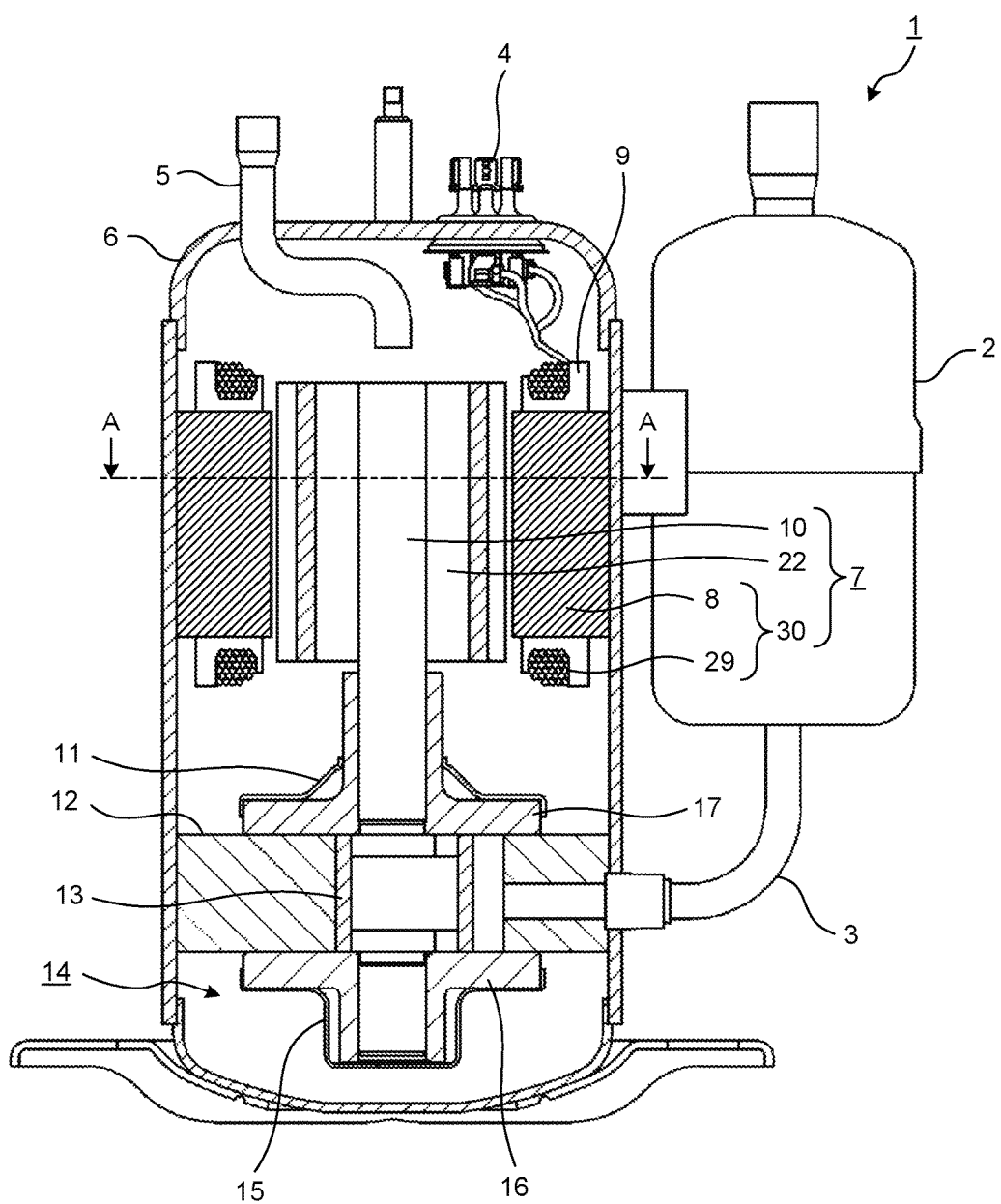
FIG. 1 is a vertical cross-sectional view of a rotary compressor provided with a permanent magnet embedded electric motor according to an embodiment of the present invention.
Figure 2:
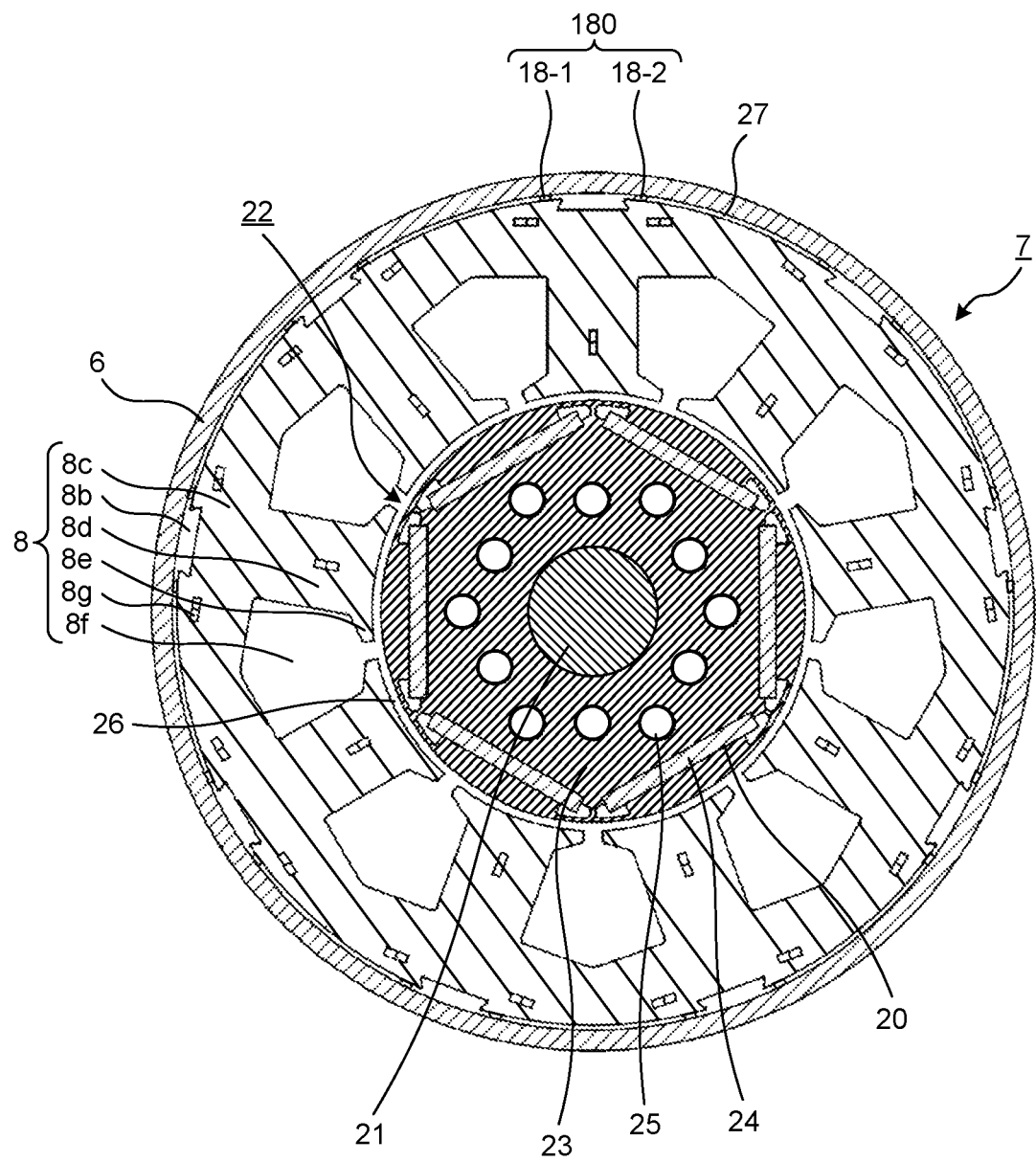
FIG. 2 is a cross-sectional view taken along the arrow A-A illustrated in FIG. 1.
Figure 3:
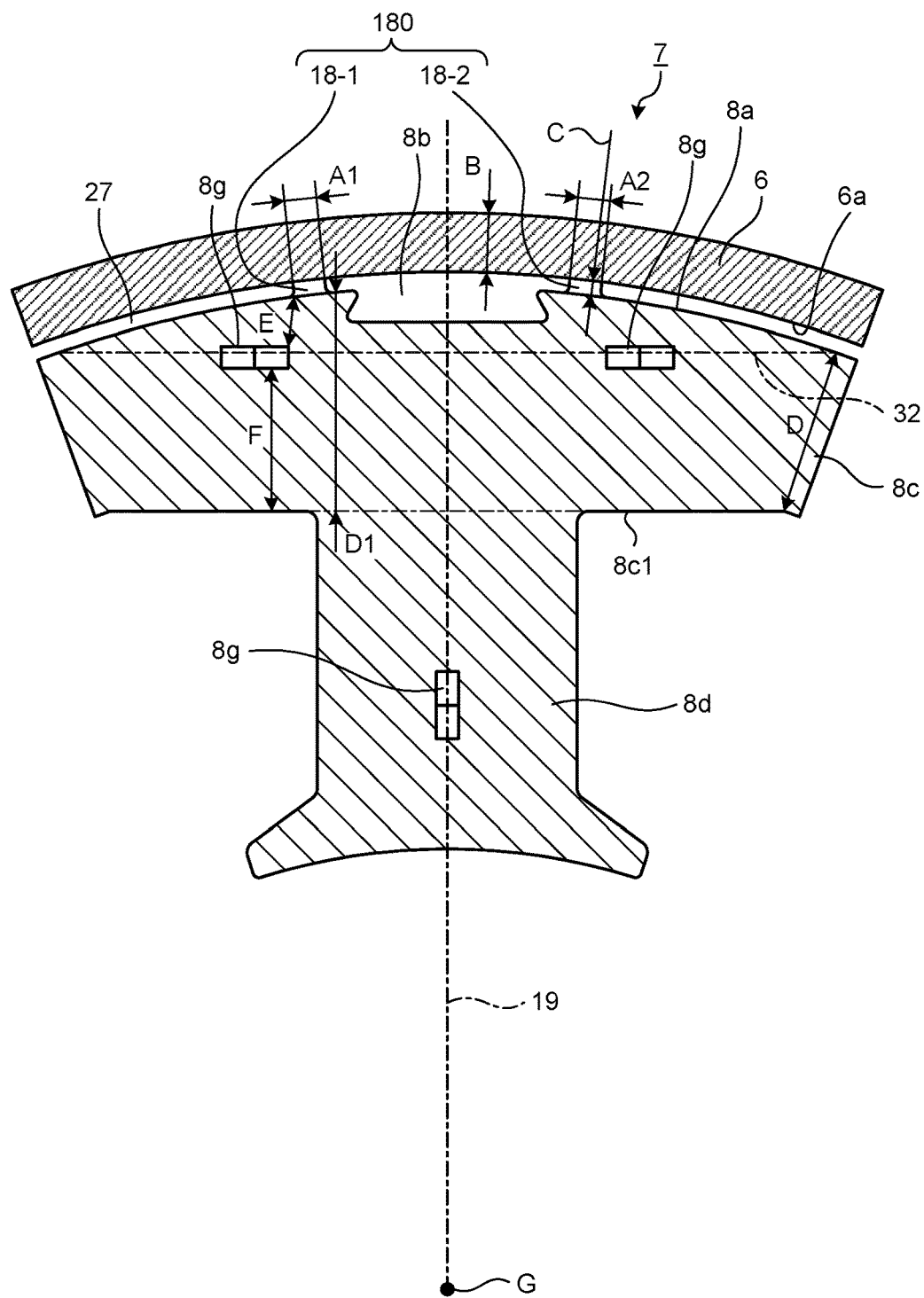
FIG. 3 is a detailed view of the major parts of the permanent magnet embedded electric motor illustrated in FIG. 2.
Figure 4:
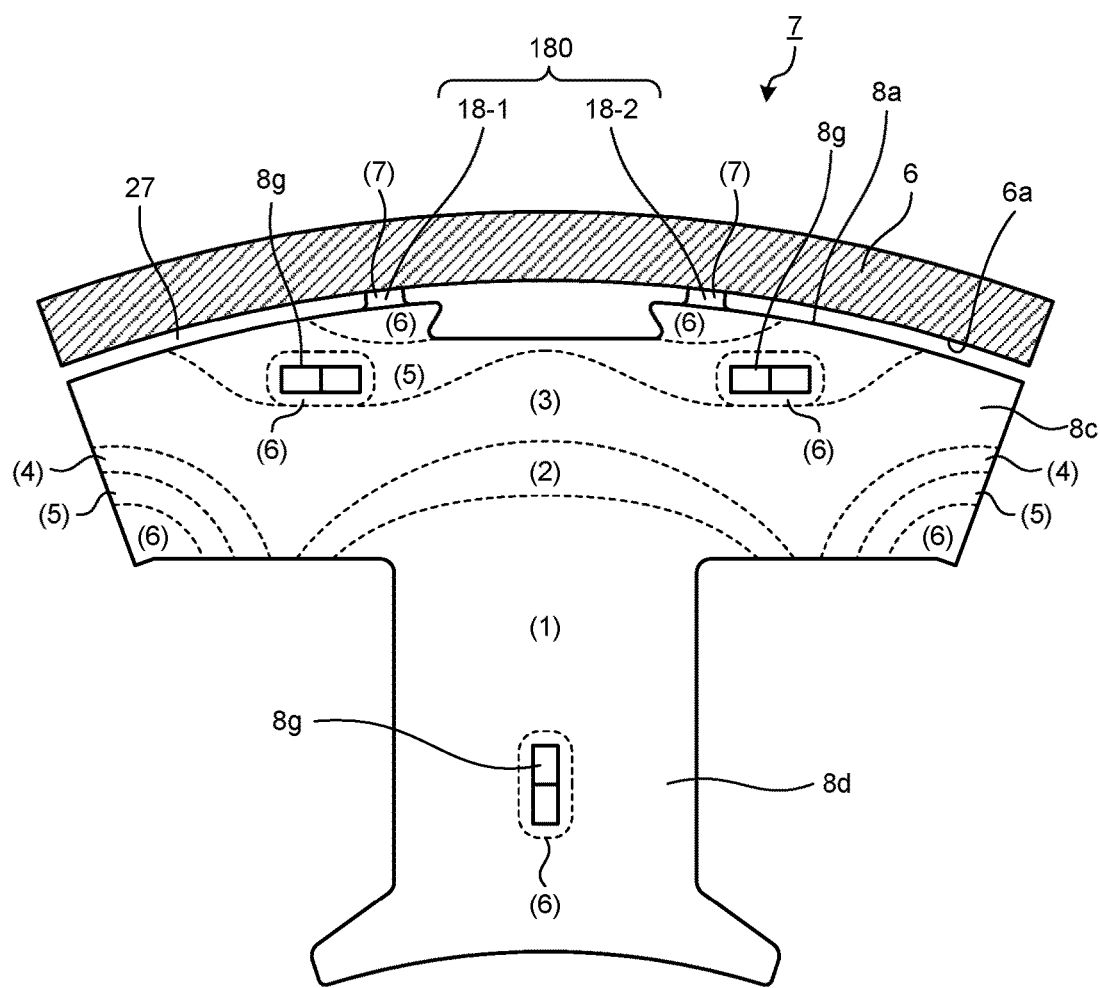
FIG. 4 is a diagram illustrating the distribution of compression stress in the permanent magnet embedded electric motor after shrink-fitting.
Figure 5:
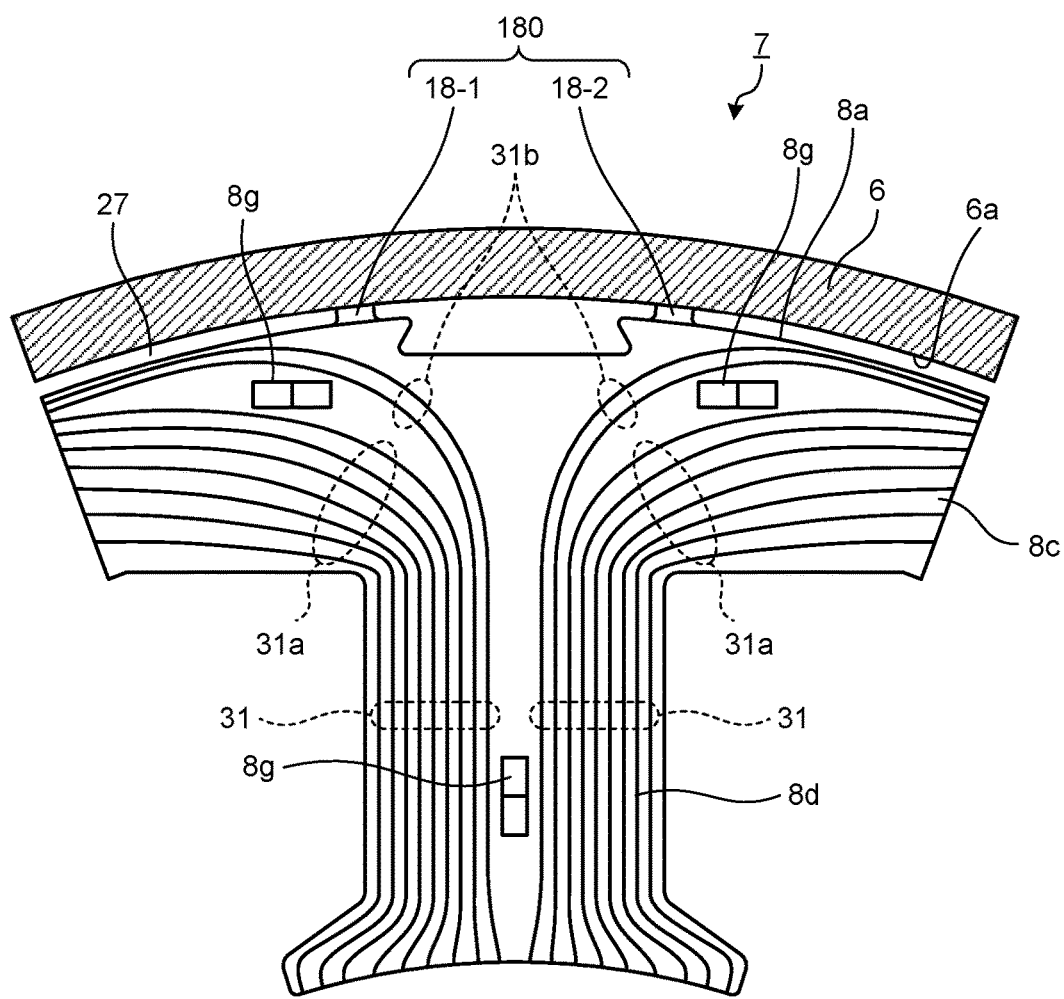
FIG. 5 is a diagram illustrating the flow of magnetic flux in the permanent magnet embedded electric motor according to the embodiment.
Figure 6:
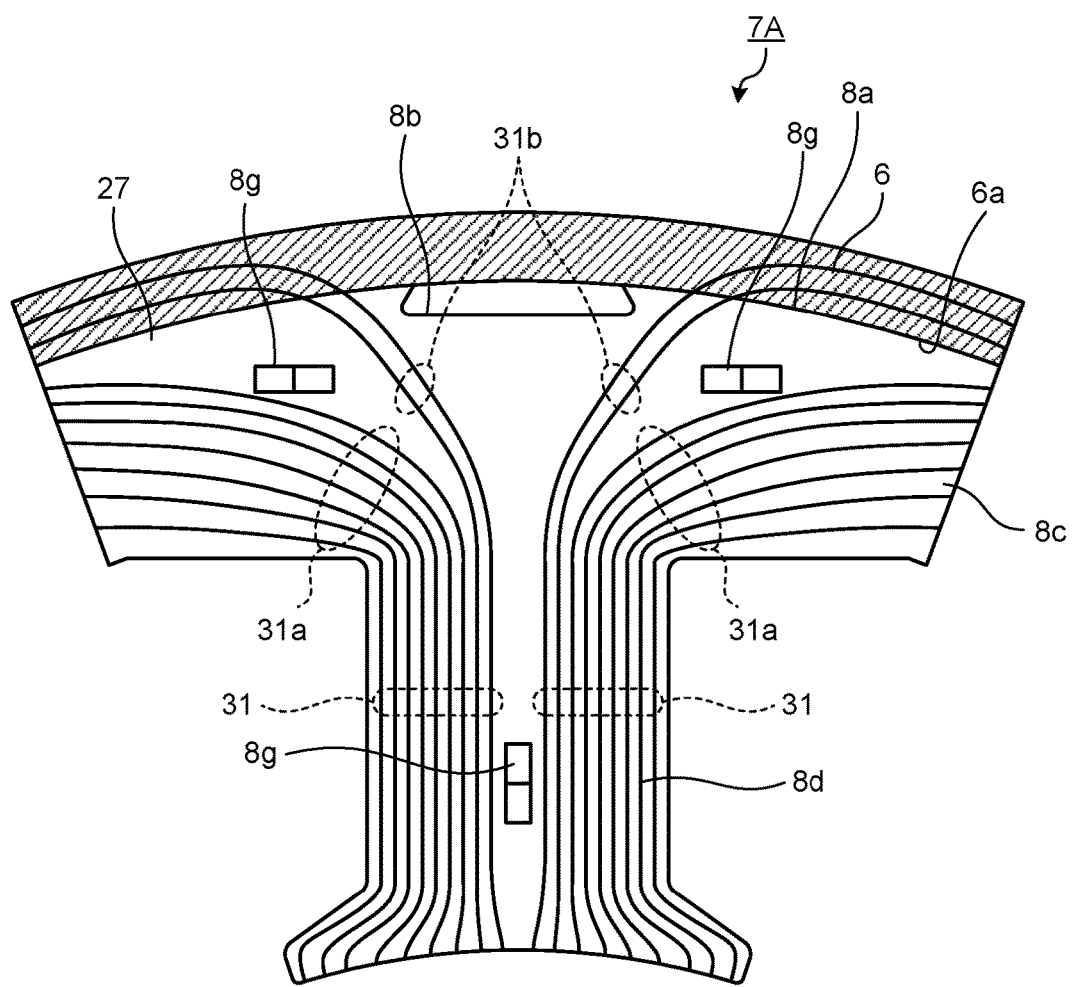
FIG. 6 is a diagram illustrating the flow of magnetic flux in a conventional electric motor.
Figure 7:
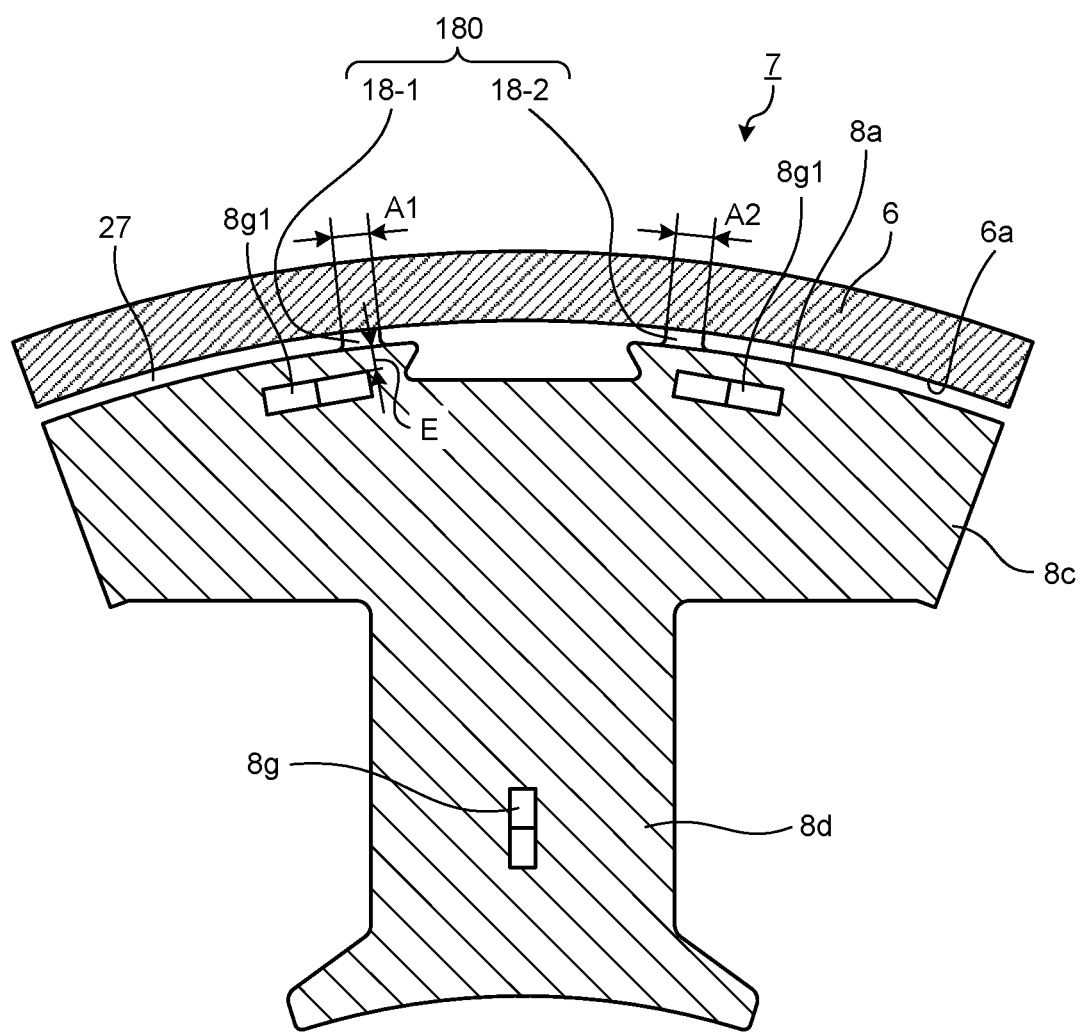
FIG. 7 is a diagram illustrating a back yoke of which the caulking position has been changed.
Figure 8:
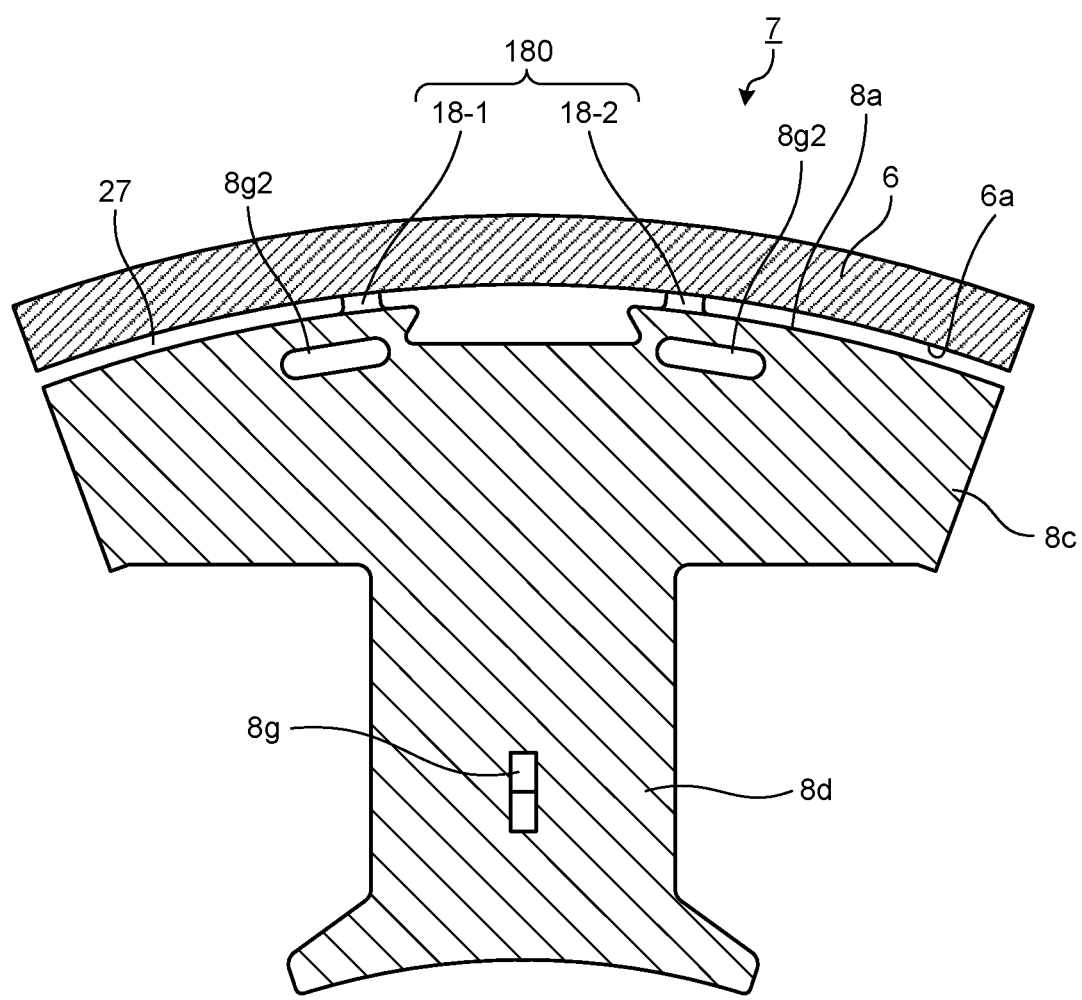
FIG. 8 is a diagram illustrating a back yoke provided with a gap instead of caulking.
Figure 9:
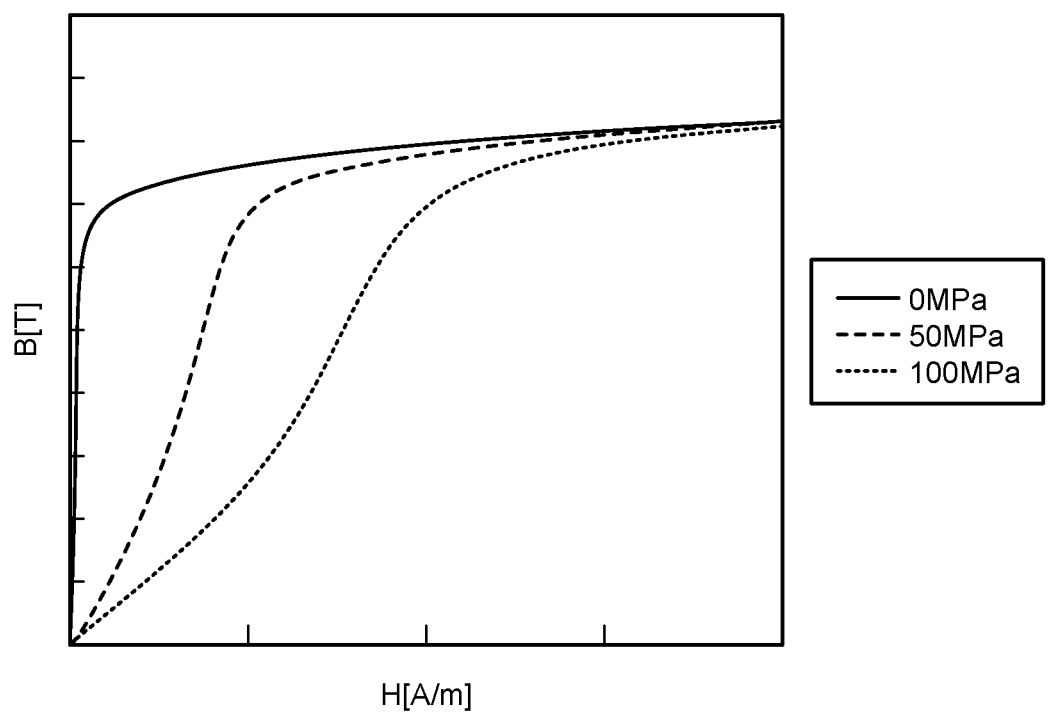
FIG. 9 is a diagram illustrating a BH curve for a magnetic body used in a compression section.
Figure 10:
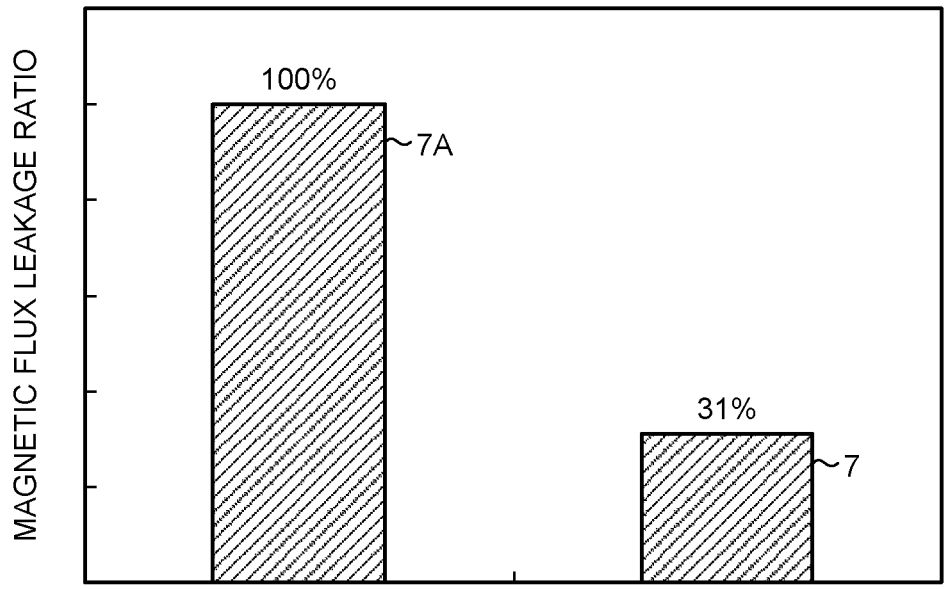
FIG. 10 is a diagram illustrating magnetic flux leakage ratios.
Figure 11:
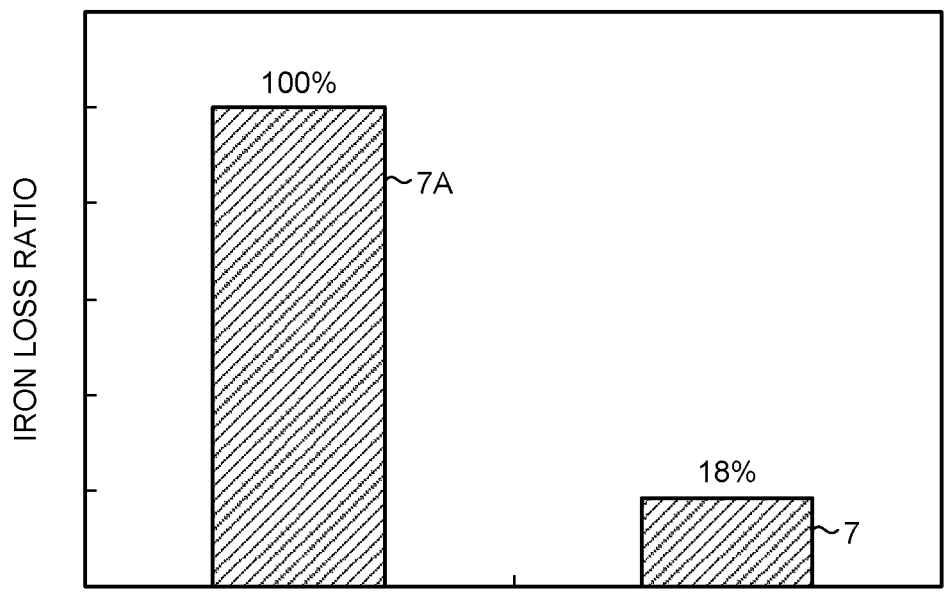
FIG. 11 is a diagram illustrating iron loss ratios.

FIG. 1 is a vertical cross-sectional view of a rotary compressor 1 provided with a permanent magnet embedded electric motor 7 according to an embodiment of the present invention. FIG. 2 is a cross-sectional view taken along the arrow A-A illustrated in FIG. 1. FIG. 3 is a detailed view of the major parts of the permanent magnet embedded electric motor 7 illustrated in FIG. 2. FIG. 4 is a diagram illustrating the distribution of compression stress in the permanent magnet embedded electric motor 7 after shrink-fitting. FIG. 5 is a diagram illustrating the flow of magnetic flux in the permanent magnet embedded electric motor 7 according to the embodiment. FIG. 6 is a diagram illustrating the flow of magnetic flux in a conventional electric motor 7A. FIG. 7 is a diagram illustrating a back yoke 8c in which the caulking position 8g has been changed. FIG. 8 is a diagram illustrating a back yoke 8c provided with a gap 8g2 instead of caulking 8g. FIG. 9 is a diagram illustrating a BH curve of the magnetic body used in a compression section group 180. FIG. 10 is a diagram illustrating ratios of magnetic flux leakages. FIG. 11 is a diagram illustrating ratios of iron losses.

A permanent magnet embedded electric motor 7 and a compression element 14 are provided in a frame 6 of a rotary compressor 1 illustrated in FIG. 1. Hereinafter, the permanent magnet embedded electric motor 7 is simply referred to as an "electric motor 7". The electric motor 7 is a brushless DC motor that includes a stator 30, a rotor 22 and a rotary shaft 10. The stator 30 includes a stator core 8 and a winding 29, with the rotary shaft 10 disposed near the center of the stator core 8. In the embodiment, although the electric motor 7 as an electric element of the closed type rotary compressor 1 is used, the electric motor 7 can be also used as the electric elements of all devices other than the rotary compressor 1.

The compression element 14 is configured to include a cylinder 12 provided in a vertically laminated state; the rotary shaft 10, which is rotated by an electric motor 7; a piston 13 into which the rotary shaft 10 is inserted; a vane not illustrated that divides the interior of the cylinder 12 into a suction side and a compression side; an upper frame 17 and a lower frame 16 as a pair of upper and lower frames to which the rotary shaft 10 is inserted to close an axial end surface of the cylinder 12; an upper discharge muffler 11 mounted on the upper frame 17; and a lower discharge muffler 15 mounted on the lower frame 16.

The frame 6 is formed in a cylindrical shape by drawing a steel sheet having a thickness of about 3 mm; and refrigerator oil (not illustrated) is accumulated at the bottom of the frame 6 to lubricate each of the sliding sections of the compression element 14. The rotor 22 is provided via a gap 26 of an inner diameter side of the stator core 8. The rotary shaft 10 is held in a rotatable state by a bearing unit provided in the lower part of the rotary compressor 1, i.e., the upper frame 17 and the lower frame 16. The stator core 8 is held in an inner circumferential section 6a of the frame by a shrink-fit. The winding 29 wound around the stator core 8 is supplied with power from a glass terminal 4 fixed to the frame 6.

The shrink-fit is a technique in which the stator core 8 with its outer diameter slightly larger than an inner diameter of the frame 6 is heated to a high temperature, e.g., 300° C., to expand the frame 6 so that the stator core 8 fits into the expanded frame 6. Thereafter, since the frame 6 shrinks when the temperature of the frame 6 drops, the stator core 8 becomes fixed into the frame 6.

FIG. 2 illustrates the stator core 8 that is disposed inside the frame 6, the rotor 22 that is disposed on the inner diameter side of the stator core 8, and a compression section group 180 that has a set of two magnetic compression sections 18-1 and 18-2 formed by a magnetic body. Eighteen compression sections 18-1 and 18-2 are formed in total in the stator core 8 of the illustrated example. Six magnet insertion holes 20 are formed on the outer circumferential section of a rotor core 23 in a hexagonal shape, and six flat plate-like permanent magnets 24 in which an N-pole and a S-pole are alternately magnetized and rare earth permanent magnets mainly containing neodymium, iron, and boron are inserted into each of the magnet insertion holes 20. A shaft hole 21 is formed on the center side of the rotor core 23, and the rotary shaft 10 for transmitting rotational energy is connected to the shaft hole 21 by a shrink-fit or a press-fit. A plurality of air holes 25 serving as flow paths for the refrigerant are provided between each of the magnet insertion holes 20 and the shaft holes 21.

The gap 26 is formed between the outer circumferential surface of the rotor core 23 and the inner circumferential surface of the stator core 8. The width of the gap 26 is 0.3 mm to 1.0 mm. A rotary magnetic field is generated by supplying the current of the frequency synchronized with the command rotation speed to the stator core 8 so that the rotor core 23 rotates. The stator core 8 is obtained by punching an electromagnetic steel sheet with a thickness of 0.30 mm or less into a particular shape, by laminating a plurality of punched electromagnetic steel sheets, and by crimping the steel sheets. Further, by performing an annealing treatment on the stator core 8 integrally provided with the compression section group 180, it is possible to lessen the distortion made when being punched, and an oxide film layer is formed on the compression section group 180 and an outer circumferential section 8a of the stator core. Because the magnetic resistance of the compression section group 180 increases due to the oxide film layer, it is possible to enhance the effect of reducing the magnetic flux leakage in the compression section group 180. Details of the structure and effect of the compression section group 180 will be described later.

The stator core 8 is configured to have a back yoke 8c; a plurality of magnetic pole teeth 8d extending from the back yoke 8c in a direction toward the center of the back yoke 8c; and teeth tip portions 8e formed on the inner diameter side of each magnetic pole teeth 8d of the plurality of magnetic pole teeth 8d. In the illustrated example, nine magnetic pole teeth 8d are formed in the back yoke 8c. Further, the stator core 8 is provided with a slot 8f serving at a space that is defined by the back yoke 8c, the magnetic pole teeth 8d, and the teeth tip portion 8e. Nine slots 8f disposed in the rotational direction are formed in the stator core 8 of the illustrated example.

The width in the rotational direction of the magnetic pole teeth 8d is formed so as to be the same width as the distance from the back yoke 8c toward the teeth tip portion 8e. The winding 29 that generates the rotary magnetic field is wound around the magnetic pole teeth 8d. The teeth tip portions 8e are formed in an umbrella shape in which both sides spread in the rotational direction.

The winding 29 is formed by directly winding a magnet wire (not illustrated) around the magnetic pole teeth 8d via an insulating section 9. This winding type is called a concentrated winding. Further, the winding 29 is connected to a three-phase Y-connection. The number of turns and the wire diameter of the winding 29 are defined by the rotational speed, the torque, the voltage specification, and the cross-sectional area of the slots, which are required characteristics.

Grooves 8b are intended to hold the stator core 8 when the stator core 8 is manufactured and are provided on the outer diameter side of the back yoke 8c on a central axis 19 that passes through a center position G of the stator core 8 and the center of the magnetic pole teeth 8d. The grooves 8b of the illustrated example are formed in a trapezoidal shape.

In the outer circumferential section 8a of the stator core, which is the outer circumferential section of the back yoke 8c corresponding to each of the nine magnetic pole teeth 8d, a compression section group 180 including a set of two compression sections 18-1 and 18-2 of the plurality of compression sections as illustrated in FIG. 3 is provided. The compression sections 18-1 and 18-2 have a configuration in which, by being deformed by a pressing force toward the stator core 8 from the frame 6 when the frame 6 shrinks due to the shrink-fit, compression stress higher than the compression stress occurring in the stator core 8 due to the pressing force occurs. In the illustrated example, the two compression sections 18-1 and 18-2 are provided at symmetrical positions in the rotational direction with respect to the central axis 19 so as to span the groove 8b. By disposing the two compression sections 18-1 and 18-2 at symmetrical positions in the rotational direction with respect to the central axis 19, when the frame 6 shrinks under the shrink-fit, the pressing force applied to the two compression sections 18-1 and 18-2 is equalized, and thus, it is possible to equalize the value of the compression stress generated in the two compression sections 18-1 and 18-2. Further, the two compression sections 18-1 and 18-2 may be continuously formed from one axial end to the other axial end of the stator core 8, or they may be provided by being divided into several places from the one axial end to the other axial end of the stator core 8.

When the sum of the respective rotating direction widths A1 and A2 of the two compression sections 18-1 and 18-2, which constitute the compression section group 180, is set as A, a radial direction thickness of the frame 6 is set as B, and a radial direction thickness of each of the compression sections 18-1 and 18-2 is set as C, then the compression section group 180 of the illustrated example has a shape that satisfies a relation following B>A>C. Because the dimension of the radial direction thickness B is greater than the dimension of the sum A, rigidity of the compression section group 180, i.e., the degree of resistance to dimensionally change, is lower than the rigidity of the frame 6. Thus, the compression section group 180 of the illustrated example is more easily deformed than the frame 6. The compression stress which occurs, when the compression section group 180 is deformed, follows a relation B≤A. That is, the compression stress is greater than the compression stress that occurs when the compression section group 180 is deformed, where B is formed to be A or less. The reason is that, in the compression section group 180 having the shape that follows B≤A, the frame 6 is more easily deformed than the compression section group 180, and the force for pressing the compression section group 180 is absorbed by the frame 6.

In the related art illustrated in Patent Literature 2, the sum of the rotating direction width on the tip surface of the radially outer side of the plurality of stress-receiving sections is greater than the thickness of the core case. That is, in a case where the sum of the rotating direction width on the tip surface of the radially outer side of the plurality of stress-receiving sections is set as A and the radial direction thickness of the core case is set as B, there is a relation that follows B≤A. Therefore, when the split stator core is housed in the core case with a shrink-fit, the force that presses on the stress-receiving section group is absorbed by the core case, and the core case is more easily deformed than the stress-receiving section group. In this case, great compression stress does not operate on the stress-receiving section group, and magnetic permeability remains at a high value in the stress-receiving section group. Thus, there are problems such as leakage of the magnetic flux in a path along such as the split stator core, the stress-receiving section group and the core case; an increase in iron loss due to the magnetic flux leakage in the core case; and a decrease in the efficiency of the electric motor.

In the embodiment, the outer diameter of the stator core 8 including the compression section group 180 is formed to be greater than the inner diameter of the frame 6 by about 100 μm at room temperature; and the rotating direction widths A1 and A2 are formed to be approximately half of the radial direction thickness B. When the stator core 8 is fixed to the frame 6 by a shrink-fit, the pressing force of the frame 6 is applied to the compression section group 180; great compression stress exceeding 100 MPa occurs locally in the respective compression sections 18-1 and 18-2; and a compression stress of approximately 50 MPa occurs on the outer circumferential side of the back yoke 8c.

FIG. 9 illustrates a BH curve corresponding to the compression stress that occurs in the compression section group 180, in which a horizontal axis thereof represents the magnetic field intensity H, and a vertical axis thereof represents the magnetic flux density B. Three BH curves are obtained for when the compression stress is 0 MPa, 50 MPa and 100 MPa. The magnetic flux density B can be represented by the product of the magnetic permeability μ and the magnetic field intensity H. Therefore, when the intensity H of the magnetic field is set at a constant value, because the compression stress in the compression section group 180 becomes higher, the magnetic permeability of the compression section group 180, i.e., the magnetic flux density B, becomes lower. Therefore, in the compression section group 180 in which the compression stress occurs, it is higher than the compression stress occurring on the outer circumferential side of the back yoke 8*c*, and therefore, the magnetic flux leakage from the stator core 8 to the frame 6 is reduced. Here, the compression stress occurring on the outer circumferential side of the back yoke 8*c* is 50 MPa for example, and compression stress higher than the compression stress is 100 MPa. As a result, the iron loss that occurs in the frame 6 caused by the magnetic flux leakage is reduced.

FIG. 4 illustrates, in the electric motor 7 according to the embodiment, the distribution of the compression stress that occurs in the stator core 8 and the compression section group 180 during shrink-fit. Numbers in parentheses indicate the magnitude of the compression stress, and as the value of the number is large, the region with the number is a region on which higher compression stress acts. In the electric motor 7 according to the embodiment, large compression stress represented by (7), 100 MPa as an example, acts on the compression section group 180 along with the shrink-fit. Although compression stress represented by (5) and (6) also act on the back yoke 8*c*, the compression stress occurring on the outer circumferential side of the back yoke 8*c* is a value lower than the compression stress occurring in the compression section group 180. Further, large compression stress also acts around the V caulking. Hereinafter, the V caulking is referred to as a "caulking 8*g*".

FIG. 5 illustrates the magnetic flux 31 flowing in the stator core 8 in which the compression stress is distributed as illustrated in FIG. 4. The electric motor 7 being driven constitutes a magnetic circuit in which the rotary magnetic field flows through a part with small magnetic resistance, and since the magnetic resistance of the back yoke 8*c* is lower on its inner diameter side than on its outer diameter side, the magnetic flux density on the inner diameter side is high. At this time, most of the magnetic flux 31*a* of the magnetic flux 31 passing through the magnetic pole teeth 8*d* passes through the inner circumferential side of the back yoke 8*c*. Meanwhile, some magnetic flux 31*b* incapable of passing through the inner circumferential side of the back yoke 8*c* passes through the outer circumferential side of the back yoke 8*c*. Specifically, between the caulking 8*g* provided on the back yoke 8*c* and the compression section group 180, there is a region of the compression stress lower than the compression stress occurring in the compression section group 180. Thus, the magnetic flux 31*b* passes through this region. The region of compression stress lower than the compression stress occurring in the compression section group 180 is a region represented by (5) in FIG. 4.

FIG. 6 illustrates the magnetic flux 31 flowing through the back yoke 8*c* of the conventional electric motor 7A. When the conventional electric motor 7A is shrink-fitted, the most outer circumferential section 8*a* of the stator core is fixed in a state being in contact with the inner circumferential section 6*a* of the frame. When the magnetic flux density of the back yoke 8*c* increases by driving the conventional electric motor 7A at high load, the magnetic flux 31*b* incapable of passing through the inner circumferential side of the back yoke 8*c* leaks out to the frame 6 via the contact portion between the outer circumferential section 8*a* of the stator core and the inner circumferential section 6*a* of the frame. Since great iron loss occurs in the frame 6 due to the magnetic flux leakage to the frame 6 in this way, there is a risk of performance degradation of the conventional electric motor 7A caused by the magnetic flux leakage. In contrast, in the electric motor 7 according to the embodiment, since the compression section group 180 is deformed, the compression stress of the compression section group 180 is higher than the compression stress occurring on the outer circumferential side of the back yoke 8*c*, and magnetic permeability of the compression section group 180 decreases. As a result, the magnetic flux leakage flowing through the frame 6 is reduced, and a decrease in efficiency of the electric motor 7 caused by the magnetic flux leakage is reduced.

FIG. 10 illustrates a ratio of the magnetic flux leakage in the electric motor 7 according to the embodiment to the magnetic flux leakage of the conventional electric motor 7A. As can be seen from FIG. 10, in the electric motor 7 according to the embodiment, the magnetic flux leakage to the frame 6 is reduced by 69% than the conventional electric motor 7A. Further, FIG. 11 illustrates a ratio of the iron loss occurring in the frame 6 of the electric motor 7 according to the embodiment to the iron loss occurring in the frame 6 of the conventional electric motor 7A. As can be seen from FIG. 11, in the electric motor 7 according to the embodiment, the iron loss occurring in the frame 6 is reduced by 82% than the conventional electric motor 7A.

Further, since the outer circumferential side portion near the central axis 19 of the back yoke 8*c* is a part in which magnetic flux is hard to flow, the compression section 18-1 and the compression section 18-2 are preferably provided at a position close to the central axis 19. Furthermore, since the compression section 18-1 and the compression section 18-2 cannot be effectively utilized as a magnetic path of the stator core 8, the radial direction thickness C of the compression section 18-1 and the compression section 18-2 is preferably thin, and is 1 mm or less.

Further, when a narrowest width in the radial direction width of the back yoke 8*c* is set as D, and a radial direction width from a portion in which the compression section 18-1 or the compression section 18-2 is in contact with the back yoke 8*c* to an inner diameter surface 8*c*1 of the back yoke 8*c* is set as D1 in FIG. 3, the back yoke 8*c* has a shape that satisfies a relation that follows D1>D. Because the outer circumferential section 8*a* of the stator core is curved, in the back yoke 8*c*, the width of the outer circumferential section 8*a* of the stator core to the inner diameter surface 8*c*1 is not uniform. In a region of the outer diameter side of a line 32 located at a constant distance D of the outer diameter side from the inner diameter surface 8*c*1, the magnetic flux is hard to flow than the region of the inner diameter side of the line 32. Thus, by forming a back yoke 8*c* so as to satisfy a relation that follows D1>D, the magnetic flux is hard to flow through the compression section 18-1 and the compression section 18-2, and it is possible to further reduce the magnetic flux leakage.

Furthermore, the caulking 8*g* of the back yoke 8*c* illustrated in FIG. 3 is preferably provided on the outer circumferential side of the back yoke 8*c*. In a case where the distance between the compression section 18-1 or the compression section 18-2 and the caulking 8*g* is set as E, and the distance from the caulking 8*g* to the inner diameter surface 8*c*1 is set as F, the caulking 8*g* of the back yoke 8*c* has a shape that satisfies a relation that follows F>E. FIG. 7 illustrates an example of a caulking 8*g*1 in which the distance E is formed to be narrower than the configuration example of FIG. 3. By providing the caulking 8*g*1 near the compression section 18-1 or the compression section 18-2 in this way, a region with high compression stress is formed on the outer circumferential side of the back yoke 8*c*, and the magnetic permeability of this region decreases. Therefore, the magnetic flux 31*b* illustrated in FIG. 5 is hard to flow in this region, and it is possible to enhance the effect of reducing the magnetic flux leakage to the frame 6.

Moreover, in the caulking 8*g*1 of FIG. 7, a lengthwise width of the caulking 8*g*1 is formed to be wider than the rotating direction widths A1 and A2 of the compression sections 18-1 and 18-2, and the lengthwise surface of the caulking 8g1 is formed in parallel to the lengthwise widths of the compression sections 18-1 and 18-2. With this configuration, it is possible to further enhance the effect of reducing the magnetic flux leakage to the frame 6. Further, it is possible to obtain the same effect even when using a gap 8g2 as illustrated in FIG. 8, instead of the caulking 8g and 8g1 that is a V caulking of the illustrated example.

Further, when the annealing treatment is applied to the frame 6, an oxide film layer is formed on the inner circumferential section 6a of the frame, and the magnetic resistance of the frame 6 increases by the oxide film layer. Therefore, it is possible to enhance the effect of reducing the magnetic flux that enters the frame 6 from the stator core 8.

Further, it is preferable to use a rare earth magnet as the permanent magnet 24 of the rotor 22 according to the embodiment. Since the residual magnetic flux density of the rare earth magnet is high, the magnetic flux density of the stator core 8 is high in the electric motor 7 using a rare earth magnet, and the magnetic flux is liable to leak to the frame 6. However, it is possible to effectively reduce the magnetic flux leakage by providing the compression section group 180, and the effect of efficiency improvement is great. Moreover, the performance improvement can also lead to a reduction of the magnet usage.

Further, it is desirable to use the winding 29 of a concentrated winding in the stator 30 according to the embodiment. The magnetic flux is distributed so that the magnetic flux is locally concentrated in the electric motor 7 of the concentrated winding as compared to the case of distributed winding, and thus the magnetic flux density of the stator core 8 increases and the magnetic flux is liable to leak to the frame 6. However, it is possible to effectively reduce the magnetic flux leakage by providing the compression section group 180, and the effect of efficiency improvement is great.

Next, the operation of the rotary compressor 1 will be described. The refrigerant gas supplied from the accumulator 2 is sucked into the cylinder 12 from a suction pipe 3 fixed to the frame 6. When the electric motor 7 rotates by the electric conduction of the inverter, the piston 13 fitted to the rotary shaft 10 rotates inside the cylinder 12. Thus, the compression of the refrigerant is performed inside the cylinder 12. After passing through the muffler, the refrigerant rises in the frame 6 through the air hole 25 and the gap 26 of the electric motor 7. At this time, the refrigerator oil is mixed with the compressed refrigerant. When the mixture of the refrigerant and the refrigerator oil passes through the air hole 25 provided in a rotor iron core, the separation of the refrigerant and the refrigerator oil is promoted, and thus, it possible to prevent the refrigerator oil from flowing into a discharge pipe 5. In this way, the compressed refrigerant is supplied to the high pressure side of the refrigeration cycle through the discharge pipe 5 provided in the frame 6.

Further, although R410A, R407C and R22 are conventionally used as the refrigerant of the rotary compressor 1, it is also possible to apply any refrigerant of a low GWP, that is, a low global warming potential. A low GWP refrigerant is desired from the viewpoint of preventing the global warming. As a representative example of the low GWP refrigerant, there are following refrigerants.

(1) HFO-1234yf (CF3CF=CH2) that is an example of halogenated hydrocarbon having a double bond of carbon in the composition. HFO is an abbreviation of Hydro-Fluoro-Olefin, and Olefin is unsaturated hydrocarbon with one double bond. In addition, GWP of HFO-1234yf is 4.

(2) R1270 (propylene) that is an example of hydrocarbon having a double bond of carbon in the composition. Further, although GWP is 3 smaller than HFO-1234yf, flammability is greater than HFO-1234yf.

(3) A mixture of HFO-1234yf and R32 is an example of a mixture containing any of halogenated hydrocarbon having a double bond of carbon in the composition or hydrocarbon having a double bond of carbon in the composition. Since HFO-1234yf is a low-pressure refrigerant, the pressure loss increases, and the refrigeration cycle, in particular, the performance in an evaporator is liable to decrease. Therefore, a mixture of R32 or R41 as a high-pressure refrigerant compared to HFO-1234yf is practically influential.

It is possible to obtain a highly reliable compressor with high efficiency, by using the electric motor 7 in the rotary compressor 1 configured as described above. Moreover, by using the rotary compressor 1 in the refrigerating and air conditioning device, it is possible to obtain a highly reliable refrigerating and air conditioning device with high efficiency and low noise.

Further, although an example of fixing the stator core 8 to the frame 6 by using a shrink-fit has been described in the embodiment, freeze-fitting as a method of cooling the stator core 8 or press-fit may be applied. Further, although a brushless DC motor has been described as an example of the electric motor 7 in the embodiment, the fixing method of the stator core 8 of the embodiment is also applicable to an electric motor other than the brushless DC motors and is also applicable to a motor that does not use a permanent magnet of an induction electric motor as an example, and it is also possible to obtain the same effect in these motors.

Further, although the number of magnetic poles of the rotor 22 may be two or more poles, in the embodiment, an electric motor 7 in which the number of magnetic poles of the rotor 22 is six is used as an example. Also, although an Nd—Fe—B (neodymium-iron-boron)-series rare earth magnet is used as a permanent magnet in the embodiment, the kind of the permanent magnets is not limited thereto. The rare earth magnet used for the rotor 22 of the compressor electric motor 7 is added with Dy (dysprosium) that is a heavy rare earth element amount to reduce a decrease in demagnetization due to a decrease in a coercive force at high temperatures. The rare earth magnet has characteristics in which, when Dy is added, the coercive force is improved, and meanwhile, the residual magnetic flux density decreases. Thus, the rare earth magnet with Dy content of 2% is used here. Further, the electric motor 7 using the rotor 22 of the embodiment performs a high-efficiency operation according to the required product load conditions, by performing the variable speed driving through a PWM control using an inverter of a driving circuit (not illustrated). Further, the electric motor 7 using the rotor 22 of the embodiment is mounted on a compressor of an air conditioner as an example to ensure the use in 100° C. or more high-temperature atmosphere.

Further, although the compression section group 180 of the embodiment is formed in a protruding shape toward the inner circumferential section 6a of the frame from the outer circumferential section 8a of the stator core, integrally with the stator core 8, the configuration of the compression section group 180 is not limited thereto. The compression section group 180 may be formed in a protruding shape toward the outer circumferential section 8a of the stator core from the inner circumferential section 6a of the frame, integrally with the frame 6. Also, the compression section group 180 produced separately from the stator core 8 and the frame 6 may be provided between the stator core 8 and the frame 6. It is also possible to reduce the magnetic flux leakage flowing through the frame 6 by such a configuration.

Also, when the compression section group 180 is integrally formed with the stator core 8, the thickness of the electromagnetic steel sheet constituting the stator core 8 is desirably set as 0.30 mm or less. The thinner the sheet thickness of the electromagnetic steel sheet is, the larger the amount of deformation of electromagnetic steel sheet is, and the compression stress occurring in the electromagnetic steel sheets increases accordingly. The compression stress occurring in the compression section group 180 formed integrally with the stator core 8 formed by laminating the magnetic steel sheets having a thickness of 0.30 mm represents a value higher than the compression stress occurring in the compression section group 180 formed integrally with the stator core 8 formed by laminating the electromagnetic steel sheets having the thickness of 0.35 mm. Therefore, it is possible to further increase the effect of reducing the magnetic flux that enters the frame 6.

Moreover, in the embodiment, although the compression section group 180 includes two compression sections 18-1 and 18-2, the number of compression sections constituting the compression section group 180 is not limited to two. As long as a sum A of rotating direction widths of the plurality of compression sections constituting the compression section group 180 and a radial direction thickness B of the frame 6 are in a relation that follows B>A, the number of compression sections constituting the compression section group 180 may be three or more. Further, in the embodiment, the two compression sections 18-1 and 18-2 constituting the compression section group 180 span the groove 8*b* and are disposed at symmetrical positions with respect to the central axis 19 in the rotational direction. However, the position of arranging the plurality of compression sections constituting the compression section group 180 is not limited thereto. As long as the sum A and the radial direction thickness B are in the relation that follows B>A, the two compression sections span the groove 8*b* and may be provided at asymmetrical positions with respect to the central axis 19 in the rotational direction. Also, the electric motor 7 according to the embodiment is not limited to the brushless DC motor, which, however, may be a motor other than the brushless DC motor.

As described above, the electric motor 7 according to the embodiment is equipped with the stator core 8 that is disposed inside the frame 6 and has the back yoke 8*c* and a plurality of magnetic pole teeth 8*d*, the rotor 22 disposed on the inner diameter side of the plurality of magnetic pole teeth 8*d*, and a plurality of compression sections in which compression stress higher than the compression stress occurring in the back yoke 8*c* due to the pressing force generated between the frame 6 and the back yoke 8*c* occur. In the outer circumferential section 8*a* of the stator core that is an outer circumferential section of the back yoke 8*c* corresponding to each of the plurality of magnetic pole teeth 8*d*, the compression section group 180 having a set of two or more compression sections 18-1 and 18-2 of the plurality of compression sections is disposed. The sum A of the rotating direction widths A1 and A2 of the plurality of compression sections 18-1 and 18-2 constituting the compression section group 180 is smaller than the radial direction thickness B of the frame 6. With this configuration, the magnetic permeability of the deformed compression sections 18-1 and 18-2 decreases, and the magnetic flux leaking from the stator core 8 to the frame 6 is reduced. Therefore, because the iron loss occurring in the frame 6 caused by the magnetic flux leakage is reduced, it is possible to obtain an electric motor 7 with efficiency higher than that of the related art. There is an effect of improving the efficiency of the saving rare earth motor with a high magnetic flux density, and it is possible to apply the performance improvement to a reduction of the magnet usage.

Further, the embodiments of the present invention illustrate an example of the contents of the present invention and may be combined with another known techniques, and it is a matter of course that the embodiments may also be configured with a partial omission and change within the scope that does not depart from the scope of the present invention.

The invention claimed is:

1. A permanent magnet embedded electric motor comprising:
   a stator core disposed inside a frame and having a back yoke and a plurality of magnetic pole teeth extending from the back yoke in a direction toward a center of the back yoke;
   a rotor disposed on an inner diameter side of the plurality of magnetic pole teeth; and
   a plurality of compression sections, wherein
   at least two of the compression sections are made to be a set between an outer circumferential section of the back yoke and an inner circumferential section of the frame and are disposed on the outer circumferential section of the back yoke corresponding to each of the magnetic pole teeth,
   a sum of rotating direction widths in the plurality of the compression sections provided on each of the magnetic pole teeth is smaller than a radial direction thickness of the frame,
   compression stress, in each of the compression sections due to deformation due to the pressing force generated between the frame and the back yoke, is higher than compression stress generated due to the pressing force in the back yoke,
   a plurality of grooves is provided on an outer diameter side of the back yoke, and each groove of the plurality of grooves is located between two of the compression sections,
   a bottom surface of each of the grooves is located radially inward of the outer circumferential section of the back yoke,
   a pair of caulking positions or a pair of gaps that corresponds to the two compression sections is provided in each of the magnetic pole teeth, and
   a caulking position length, which spans the pair of caulking positions, or a gap position length, which spans the pair of gaps, is larger than a compression section length, which spans the two compression sections.

2. The permanent magnet embedded electric motor according to claim 1, wherein, when a thinnest portion in the radial direction width of the back yoke is set as D, and a radial direction width from a portion in which each of the compression sections is in contact with the back yoke to an inner diameter surface of the back yoke is set as D1, the back yoke has a shape that satisfies a relation where D1>D.

3. The permanent magnet embedded electric motor according to claim 2, wherein, when a distance between each of the compression sections and a caulking is set as E, and a distance from the caulking to the inner diameter surface is set as F, the caulking has a shape that satisfies a relation where F>E.

4. The permanent magnet embedded electric motor according to claim 1, wherein the stator core is subjected to an annealing treatment.

5. The permanent magnet embedded electric motor according to claim 1, wherein the frame is subjected to an annealing treatment.

6. The permanent magnet embedded electric motor according to claim 1, wherein the permanent magnet embedded in the rotor is a rare earth magnet.

7. The permanent magnet embedded electric motor according to claim 1, wherein concentrated winding is applied to the stator core.

8. The permanent magnet embedded electric motor according to claim 1, wherein each of the compression sections is formed in a protruding shape toward the inner circumferential section of the frame from the outer circumferential section of the back yoke and is integral with the stator core.

9. The permanent magnet embedded electric motor according to claim 8, wherein a thickness of an electromagnetic steel sheet constituting the stator core formed integrally with each of the compression sections is 0.30 mm or less.

10. The permanent magnet embedded electric motor according to claim 1, wherein each of the compression sections is formed in a protruding shape toward the outer circumferential section of the back yoke from the inner circumferential section of the frame and is integral with the frame.

11. A compressor equipped with the permanent magnet embedded electric motor according to claim 1.

12. A refrigerating and air conditioning device equipped with the compressor according to claim 11.

13. The permanent magnet embedded electric motor according to claim 1, wherein a magnetic permeability of each of the plurality of compression sections becomes lower as compression stress applied to the compression sections becomes higher.

14. The permanent magnet embedded electric motor according to claim 1, wherein each groove is centered on a central axis of a corresponding tooth of the core.

15. The permanent magnet embedded electric motor according to claim 1, wherein each groove of the plurality of grooves has a trapezoidal shape.

16. The permanent magnet embedded electric motor according to claim 1, wherein each groove of the plurality of grooves is provided to extend parallel to a rotation axis of the rotor.

17. The permanent magnet embedded electric motor according to claim 1, wherein the stator core includes a plurality of electromagnetic steel sheets, which are laminated.

18. The permanent magnet embedded electric motor according to claim 1, wherein the at least two of the compression sections are symmetrically located on opposite sides of one groove of the plurality of grooves.

* * * * *